US011028247B2

(12) United States Patent
Fricke et al.

(10) Patent No.: US 11,028,247 B2
(45) Date of Patent: Jun. 8, 2021

(54) PROCESS FOR PRODUCING POROUS ALGINATE-BASED AEROGELS

(71) Applicant: BASF SE, Ludwigshafen (DE)

(72) Inventors: Marc Fricke, Osnabrueck (DE); Dirk Weinrich, Osnabrueck (DE); Wibke Loelsberg, Osnabrueck (DE); Raman Subrahmanyam, Hamburg (DE); Irina Smirnova, Hamburg (DE); Pavel Gurikov, Hamburg (DE)

(73) Assignee: BASF SE, Ludwigshafen (DE)

( * ) Notice: Subject to any disclaimer, the term of this patent is extended or adjusted under 35 U.S.C. 154(b) by 247 days.

(21) Appl. No.: 15/978,647

(22) Filed: May 14, 2018

(65) Prior Publication Data

US 2018/0258249 A1    Sep. 13, 2018

Related U.S. Application Data

(62) Division of application No. 15/312,541, filed as application No. PCT/EP2015/060872 on May 18, 2015, now Pat. No. 10,017,621.

(30) Foreign Application Priority Data

May 19, 2014    (EP) .................................... 14168810

(51) Int. Cl.
| | |
|---|---|
| *C08J 9/28* | (2006.01) |
| *C08J 9/00* | (2006.01) |
| *C08J 9/12* | (2006.01) |
| *C08J 9/35* | (2006.01) |
| *C09K 5/14* | (2006.01) |

(52) U.S. Cl.
CPC .............. *C08J 9/28* (2013.01); *C08J 9/0066* (2013.01); *C08J 9/122* (2013.01); *C08J 9/35* (2013.01); *C09K 5/14* (2013.01); *C08J 2201/026* (2013.01); *C08J 2201/05* (2013.01); *C08J 2201/0502* (2013.01); *C08J 2203/06* (2013.01); *C08J 2205/022* (2013.01); *C08J 2205/024* (2013.01); *C08J 2205/026* (2013.01); *C08J 2205/028* (2013.01); *C08J 2205/042* (2013.01); *C08J 2305/04* (2013.01); *C08J 2483/00* (2013.01)

(58) Field of Classification Search
CPC ... C08J 9/28; C08J 9/0066; C08J 9/122; C08J 9/35; C08J 2201/026; C08J 2201/05; C08J 2201/0502; C08J 2305/04; C08J 2205/026; C08J 2205/028; C08J 2205/022; C08J 2205/042; C08J 2205/04
See application file for complete search history.

(56) References Cited

U.S. PATENT DOCUMENTS

| | | | |
|---|---|---|---|
| 3,653,383 | A | 4/1972 | Wise |
| 5,718,916 | A | 2/1998 | Scherr |
| 2011/0180751 | A1 | 7/2011 | Rein |
| 2013/0018112 | A1 | 1/2013 | Thielemans et al. |
| 2014/0079931 | A1 | 3/2014 | Berglund et al. |

FOREIGN PATENT DOCUMENTS

| | | |
|---|---|---|
| EP | 0 251 905 A2 | 1/1988 |
| WO | WO 94/00512 A1 | 1/1994 |
| WO | WO 00/24799 A1 | 5/2000 |
| WO | WO 01/17377 A1 | 3/2001 |
| WO | WO 2009/027310 A1 | 3/2009 |

OTHER PUBLICATIONS

Partap et al. "'Supercritical Carbon Dioxide in Water' Emulsion Templated Synthesis of Porous Calcium Alginate Hydrogels," from Advanced Materials, (2006), 18, pp. 501-504. (Year: 2006).*
Yi Cheng et al. "Reinforced low density alginate-based aerogels: Preparation, hydrophobic modification, and characterization," Carbohydrate Polymers (2012), 88, pp. 1093-1099. (Year: 2012).*
International Search Report and Written Opinion dated Jul. 28, 2015 in PCT/EP2015/060872.
International Preliminary Report on Patentability dated Jul. 8, 2016 in PCT/EP2015/060872.
Extended European Search Report dated Oct. 30, 2014 in Patent Application No. 14168810.1.
Sonia Partap, et al., "Supercritical Carbon Dioxide in Water" Emulsion-Templated Synthesis of Porous Calcium Alginate Hydrogels Advanced Materials, vol. 18, No. 4, XP055019107, Feb. 17, 2006, pp. 501-504.
Kurt Ingar Draget, et al., "Homogeneous Alginate Gels: A Technical Approach" Carbohydrate Polymers, vol. 14, 1991, pp. 159-178.
Rompp Chemie Lexikon "Naturstoffe" (Encyclopedia of Natural Products) published by ThiemeVerlag,1997, pp. 709-735 (with Cover Page).
Hans Zweifel, et al., "Plastics Additives Handbook", 5th Edition, Hanser Publishers, Munich, 2001, 30 Pages (with Cover Page, submitting Table of Content only).

(Continued)

*Primary Examiner* — Kara B Boyle
(74) *Attorney, Agent, or Firm* — Grüneberg and Myers PLLC

(57) ABSTRACT

The present invention relates to a process for preparing a porous material, at least comprising the steps of providing a mixture (I) comprising a water soluble polysaccharide, at least one compound suitable to react as cross-linker for the polysaccharide or to release a cross-linker for the polysaccharide, and water, and preparing a gel (A) comprising exposing mixture (I) to carbon dioxide at a pressure in the range of from 20 to 100 bar for a time sufficient to form a gel (A), and depressurizing the gel (A). Gel (A) subsequently is exposed to a water miscible solvent (L) to obtain a gel (B), which is dried. The invention further relates to the porous materials which can be obtained in this way and the use of the porous materials as thermal insulation material, for cosmetic applications, for biomedical applications or for pharmaceutical applications.

9 Claims, No Drawings

(56) References Cited

OTHER PUBLICATIONS

Mike Robitzer, et al., "Nanostructure of Calcium Alginate Aerogels Obtained from Multistep Solvent Exchange Route" Langmuir, vol. 24, No. 21, 2008, pp. 12547-12552.
G. Reichenauer, et al., "Relationship between pore size and the gas pressure dependence of the gaseous thermal conductivity" Colloids and Surfaces A: Physicochem. Eng. Aspects, vol. 300, 2007, pp. 204-210.
A. Venkateswara Rao, et al., "Synthesis of flexible silica aerogels using methyltrimethoxysilane (MTMS) precursor" Journal of Colloid and Interface Science, vol. 300, 2006, pp. 279-285.
Horga et al, "Ionotropic alginate aerogels as precursors of dispersed oxide phases", *Science Direct*, 2007, vol. 325, pp. 251-255.
Cheng et al, "Reinforced low density alginate-bases aerogels: Preparation, hydrophobic modification and characterization", *Carbonate Polymers*, 2012, vol. 88, pp. 1093-1099.

\* cited by examiner

PROCESS FOR PRODUCING POROUS ALGINATE-BASED AEROGELS

This is a divisional of U.S. application Ser. No. 15/312,541, filed Nov. 18, 2016, which is the National Stage of International application no. PCT/EP2015/060872, filed May 18, 2015, which claims priority to European patent application no. 14168810.1, filed May 19, 2014, of which all of the disclosures are incorporated herein by reference in their entireties.

The present invention relates to a process for preparing a porous material, at least comprising the steps of providing a mixture (I) comprising a water soluble polysaccharide, at least one compound suitable to react as cross-linker for the polysaccharide or to release a cross-linker for the polysaccharide, and water, and preparing a gel (A) comprising exposing mixture (I) to carbon dioxide at a pressure in the range of from 20 to 100 bar for a time sufficient to form a gel (A), and depressurizing the gel (A). Gel (A) subsequently is exposed to a water miscible solvent (L) to obtain a gel (B), which is dried. The invention further relates to the porous materials which can be obtained in this way and the use of the porous materials as thermal insulation material, for cosmetic applications, for biomedical applications or for pharmaceutical applications.

Porous materials, for example polymer foams, having pores in the size range of a few microns or significantly below and a high porosity of at least 70% are particularly good thermal insulators on the basis of theoretical considerations.

Such porous materials having a small average pore diameter can be, for example, in the form of organic aerogels or xerogels which are produced with a sol-gel process and subsequent drying. In the sol-gel process, a sol based on a reactive organic gel precursor is first produced and the sol is then gelled by means of a crosslinking reaction to form a gel. To obtain a porous material, for example an aerogel, from the gel, the liquid has to be removed. This step will hereinafter be referred to as drying in the interests of simplicity.

The present invention relates to a process for the manufacture of polysaccharide-containing porous materials, as well as to the porous material as such and their use. In particular, the invention relates to a process for the manufacture of alginate-containing porous materials. It is for example known that alkali alginates such as sodium alginate are water-soluble, whereas earth-alkaline alginates such as calcium alginates are insoluble in water. Thus, gels can be prepared from water soluble polysaccharides, in particular natural polysaccharides such as alginates. However, for example in case of alginates, if manufacture of thicker layers is intended, difficulties arise from the fact that the homogeneous incorporation of free calcium ions into a sodium alginate solution is made difficult by the large increase of the solution's viscosity, so that disjointed calcium alginate agglomerates are the result instead of uniform products.

To overcome this problem, U.S. Pat. No. 5,718,916 suggests, for example, to add a water-soluble complexing agent such as sodium citrate to the aqueous solution of the alginate composition. If, for example, an easily soluble calcium salt such as calcium chloride is subsequently added, the immediate precipitation of calcium alginate is prevented by the presence of the complexing agent, which is supposed to prevent the formation of insoluble calcium alginate globules in the product. However, the examples of U.S. Pat. No. 5,718,916 are based of the scale of a few millimeters.

The manufacture of small-scale alginate sponges for oral use by adding soluble calcium salt (calcium gluconate) to a sodium alginate solution is described in WO 01/17377. However, for the reasons already mentioned above (no homogeneous incorporation of the calcium ions), this process is also not suitable for the manufacture of large-format alginate sponges. The application of active substances suggested therein is also made difficult due to the inhomogeneities that arise.

A process for the manufacture of polysaccharide foams, in particular based on an alginate, is known from WO 94/00512. According to one embodiment, WO 94/00512 also discloses a variant in which an insoluble carbonate or bi-carbonate salt are dispersed in the foamed polysaccharide by polyvalent metal cations and the foam subsequently treated with a strong acid in order to release carbon dioxide and to crosslink, by the cations that form, the polysaccharide while a dimensionally stable foam structure is formed. According to the printed publication, foams of a thickness of up to 5 mm can be stabilized in this manner. However, the formation of gases during manufacture leads to difficulties in controlling the size of the pores and to great inhomogeneities in the foam.

Another process for the manufacture of alginate sponges is known from U.S. Pat. No. 3,653,383. Here, calcium alginate is at first produced from alginic acid and calcium carbonate, the calcium alginate formed is then ground, and the resulting gel is subjected to freeze-drying. Relatively large-format sponge-like materials can be produced in this manner, however, the products obtained disintegrate relatively quickly in water. Thus, the alginate sponges—in particular when cut into thin layers—have a wet-strength, in particular with regard to wet breaking strength, which is insufficient for cosmetic or medical pads.

Also in the scientific literature, gelation processes induced by pressurized $CO_2$ in alginate-based systems are disclosed. Partap et al. (2006, "Supercritical Carbon Dioxide in Water" Emulsion-Templated Synthesis of Porous Calcium Alginate Hydrogels. Advanced Materials 18, 501-504) showed that sodium alginate/Ca-Citrate mixture (alginate concentrations of 8% w/v) undergoes gelation being dispersed in sc-$CO_2$ in presence of surfactant at 100 bar, 50° C. The Ca-Citrate is preformed from Na-Citrate and $CaCO_3$ and then reacted with Na-Alginate under the above mentioned conditions to release Ca-Ions. In the course of the Ca-Alginate formation Na-Citrate is formed as a byproduct, which results in reversible hydrogels (destabilized within 48 h), which have to be additionally reinforced by immersion in a solution with free calcium ions.

Draget et al. (1990, Homogeneous alginate gels: a technical approach. Carbohydrate Polymers 14, 159-178) used carbon dioxide at 1 bar to gel a sodium alginate/$CaCO_3$ mixture (1 wt % of alginate). They found that gelation time is extremely dependent on gel depth. A slice of 8 mm thickness had not gelled completely within 48 h.

However, due to the fast gelation at low alginate content the processes as disclosed in the state of the art do not allow to produce stable and homogeneous hydrogels. Hydrogels and thus the resulting aerogels produced by existing methods are dense and have never been appreciated for thermal insulation purposes. Furthermore, the gelation with pH reducers leads to organic byproducts entrapped in the hydrogels and thus the resulting aerogels.

It was therefore an object of the invention to avoid the abovementioned disadvantages. It was a further object of the present invention to provide stable gels using a simple process. In particular, a porous material based on a polysaccharide, in particular based on an alginate which does not have the abovementioned disadvantages, or has them to a reduced extent, should be provided. It was a further object of the present invention to provide porous materials which are suitable as thermal insulation material or for cosmetic or pharmaceutical applications. The porous materials should have a low thermal conductivity in the ventilated state, i.e. at atmospheric pressure. Furthermore, it was an object of the present invention to provide a process for preparing homogeneous gels from water soluble polysaccharides, in particular natural water soluble polysaccharides such as for example alginates.

According to the present invention, this object is solved by a process for preparing a porous material, at least comprising the steps of:
a) providing a mixture (I) comprising
 (i) a water soluble polysaccharide,
 (ii) at least one compound suitable to react as cross-linker for the polysaccharide or to release a cross-linker for the polysaccharide,
 (iii) water,
b) preparing a gel (A) comprising steps b1) and b2)
 b1) exposing mixture (I) to carbon dioxide at a pressure in the range of from 20 to 100 bar for a time sufficient to form a gel (A), and
 b2) depressurizing the gel (A),
c) exposing the gel (A) obtained in step b) to a water miscible solvent (L) to obtain a gel (B),
d) drying of the gel (B) obtained in step c).

According to the present invention, water soluble polysaccharides are used to form gels. Among them, the use of natural polysaccharides and/or their derivatives are especially attractive because of their stability, availability, renewability and low toxicity.

For the purposes of the present invention, a gel is a crosslinked system based on a polymer which is present in contact with a liquid (known as solvogel or lyogel), or with water as liquid (aquagel or hydrogel). Here, the polymer phase forms a continuous three-dimensional network.

In the context of the present invention, water soluble means that the solubility in water is sufficient to form a solution which can be used for preparing a gel.

According to the present invention, a gel is formed from the water soluble polysaccharide and a suitable cross-linker. The polysaccharide used for the process of the present invention has to be suitable to form a gel with a cross-linker, in particular has to have suitable functional groups.

Natural polysaccharides such as agar, alginate, carrageenan, cellulose, hyaluronic acid, pectin, starch, and xanthan gum as well as semi-synthetic polysaccharides such as modified cellulose, chitin and chitosan are particularly preferred.

It has surprisingly been found that the claimed method allows to produce biopolymer aerogels, i.e. polysaccharide based aerogels, with low solid content for thermal insulation with thermal conductivity in the range of from 10 to 30 mW/m·K, preferably from 15 to 25 mW/m·K, particularly from 18 to 20 mW/m·K. Properties of the aerogels can be customized by adjusting the reaction conditions at the stage of the formation of the hydrogel (gel (A)), or during solvent exchange as well as in the drying step. According to the present invention, it is possible to influence the properties of the hydrogels and/or aerogels by varying the ratio of the components, as well as by pressure control and also by introducing a wide range of organic and inorganic materials in the gel matrix. Both mesoporous and macroporous (foam-like) aerogels can be produced by the process according to the present invention.

The combination of process steps according to the present invention leads to an simplified process resulting in improved materials with high quality. According to the present invention, a hydrogel is formed which is subsequently subjected to a solvent exchanges, in particular under pressure resulting in a lyogel. The lyogel is subjected to further steps. All steps of the process according to the present invention can be carried out in an autoclave thus making the overall process simple and efficient. Steps which involve manual handling can be avoided.

According to a preferred embodiment of the present invention, step c) is carried out at elevated pressure. In the process of the present invention, step c) can be carried out at elevated pressure in the same apparatus as the other process steps.

In particular the solvent exchange under pressure results in a further improved process. The exchange of water and solvent is quicker. It has surprisingly been found that this effect is even more pronounced for thicker samples making the process of the present invention suitable to prepare larger aerogel blocks.

According to the present invention, the water soluble polysaccharide preferably is selected from the group consisting of agar, alginate, carrageenan, cellulose, hyaluronic acid, pectin, starch, xanthan gum, modified cellulose, chitin and chitosan.

According to a further embodiment, the present invention also relates to a process as described above, wherein the water soluble polysaccharide is an alginate.

The present invention thus also relates to a process for preparing a porous material, at least comprising the steps of:
a) providing a mixture (I) comprising
 (i) a water soluble alginate,
 (ii) at least one compound suitable to react as cross-linker for the alginate or to release a cross-linker for the alginate,
 (iii) water,
b) preparing a gel (A) comprising steps b1) and b2)
 b1) exposing mixture (I) to carbon dioxide at a pressure in the range of from 20 to 100 bar for a time sufficient to form a gel (A), and
 b2) depressurizing the gel (A),
c) exposing the gel (A) obtained in step b) to a water miscible solvent (L) to obtain a gel (B),
d) drying of the gel (B) obtained in step c).

The process according to the present invention allows to produce homogeneous and stable hydrogels at low polysaccharide concentration, for example low alginate concentration, which result in aerogels which are appropriate for thermal insulation with thermal conductivity in the range of from 10 to 30 mW/m·K, preferably from 15 to 25 mW/m·K, particularly from 18 to 20 mW/m·K.

Furthermore, a wide range of organic and inorganic materials can be entrapped, i.e. physically or co-gelled in the polysaccharide matrix, e.g. in the alginate matrix to achieve special properties. Furthermore, there are no organic byproducts associated with the process.

Suitable water soluble polysaccharides for use in mixture (I) according to step a) are in principle known to the person skilled in the art. Suitable salts are for example alkali salts such as sodium and potassium salts.

In case alginates are used, the water-soluble alginates preferably used in step a) preferably are alkali metal alginates such as alginates of sodium, or potassium. The underlying alginic acid is a natural acid polysaccharide primarily extracted from so-called brown algae (Phaeophyceae) with a high molecular weight between 30,000 and 200,000, which contains chains formed from D-mannuronic acid and L-guluronic acid. The degree of polymerization changes depending on the kind of alga used for extraction, on the season during which the algae were collected, the geographic origin of the algae as well as the age of the plants. The main kinds of brown algae from which alginic acid is obtained, are, for example *Macrocystis pyrifera, Laminaria cloustoni, Laminaria hyperborea, Laminaria flexicaulis, Laminaria digitata, Ascophyllum nodosum* and *Fucus serratus*. However, alginic acid or alkali alginates can also be obtained microbiologically, for example by fermentation with *Pseudomonas aeruginosa* or mutants of *Pseudomonas putida, Pseudomonas fluorescens* or *Pseudomonas mendocina*, see. e.g. EP-A-251905 and the entra regarding "alginic acid" in Rompp Chemie Lexikon "Naturstoffe" (Encyclopedia of Natural Products) published by Thieme Verlag, 1997.

In principle, all available water soluble polysaccharides which are suitable to form a gel with a cross-linker can be used in the context of the present invention. The molecular weight of the polysaccharide and the particle size may vary in wide ranges.

In the process according to the present invention, a mixture (I) is provided according to step a). Mixture (I) comprises the water soluble polysaccharide, at least one compound suitable to react as cross-linker for the polysaccharide or to release a cross-linker for the polysaccharide (as compound (ii)) and water.

According to the invention, in case alginates are used, alginates with an average particle size of up to about 0.2 mm and a viscosity in aqueous solution of from 300 to 800 mPas (1% solution, pH 7, 20° C.) are preferred. According to the invention, sodium alginate is particularly preferred. The aqueous solution of the water-soluble alginate used in step a) preferably has such a concentration, that, in mixture (I) a concentration is formed of 0.2 to 3 wt %, more preferably 0.3 wt % to 2.5 wt %, and still more preferably 0.4 wt % to 1.2 wt % of alginate in relation to the amount of water used. The solution can be prepared by suspending the desired amount of alginate in, e.g., distilled water.

According to the present invention, at least one compound suitable to react as cross-linker for the polysaccharide or to release a cross-linker for the polysaccharide is present in mixture (I) as compound (ii). This compound is preferably suspended or dispersed in the aqueous solution The at least one compound suitable to react as cross-linker for the polysaccharide or to release a cross-linker for the polysaccharide can be a salt of a polyvalent metal ion. According to the present invention, preferably one or more salts of a polyvalent metal ion with a multidentate complexing anion are comprised in mixture (I).

According to the present invention, polyvalent metal ions are suitable which form poorly soluble compounds with the water soluble polysaccharide, in particular the alginate, used, i.e. which act as cross-linking metal ions. Such polyvalent metal ions include, for example, alkaline earth metal ions and transition metal ions which form poorly soluble compounds with polysaccharides, in particular alginates. Alkaline earth metal ions, such as magnesium or calcium are preferred. Calcium is particularly preferred. Calcium salts are particularly preferred according to the invention for they are physiologically and, particularly, cosmetically acceptable and have a strong cross-linking and/or gelation effect compared to alginates. In addition, e.g. beryllium, barium, strontium, zinc, cobalt, nickel, copper, manganese, iron, chromium, vanadium, titanium, zirconium, cadmium, aluminum can also be used.

The polyvalent metal ions preferably are added in the form of their poorly soluble salts. In principle, the corresponding anions can be selected arbitrarily, however, in water, they must form poorly soluble salts with the polyvalent metal ions or cations. Preferably, carbonates and hydroxy carbonates, such as cobalt carbonate, nickel carbonate, zinc carbonate, copper carbonate and others can be utilized, preferably together with or instead of calcium carbonate.

The amount of the poorly soluble salt of the polyvalent metal ion is selected, so that the concentration of the salt in the resulting solution preferably is between about 0.1 and 500 mmol/litre, whereby, in this case, the total amount of the salt in relation to the volume of the solution is meant, even if the salt does not dissolve completely.

The amount of the added poorly soluble salt of the polyvalent metal ion in relation to the amount of the water soluble polysaccharide, in particular alginate is preferably selected so that the molar ratio of the polysaccharide, for example the alginate, to the poorly soluble of the polyvalent metal ion is between 0.001 and 1.

According to a further embodiment, the present invention also relates to a process as described above, wherein the compound suitable to react as cross-linker for the polysaccharide or to release a cross-linker for the polysaccharide is selected from the group consisting of carbonates and hydroxy carbonates. According to a further embodiment, the present invention also relates to a process as described above, wherein the compound suitable to react as cross-linker for the alginate or to release a cross-linker for the alginate is selected from the group consisting of carbonates and hydroxy carbonates.

According to a further embodiment, the present invention also relates to a process as described above, wherein mixture (I) comprises calcium carbonate as compound (ii).

According to the present invention, mixture (I) can also comprise further compounds.

The mixture (I) provided in step (a) can also comprise further salts, in particular such salts that do not form gels, and customary auxiliaries known to those skilled in the art as further constituents. Mention may be made by way of example of surface-active substances, flame retardants, nucleating agents, oxidation stabilizers, lubricants and mold release agents, dyes and pigments, stabilizers, e.g. against hydrolysis, light, heat or discoloration, inorganic and/or organic fillers, reinforcing materials and biocides.

Further information regarding the abovementioned auxiliaries and additives may be found in the literature, e.g. in Plastics Additive Handbook, 5th edition, H. Zweifel, ed. Hanser Publishers, Munich, 2001.

Furthermore, the mixture (I) can comprise cosmetic or medical active substances.

According to a further embodiment, the present invention thus also relates to a process as described above, wherein a water insoluble solid (S) is added to mixture (I).

According to a further embodiment, the present invention also relates to a process as described above, wherein a compound (C) is added to mixture (I) in step a) which is suitable to form a gel.

For example suitable organic and/or inorganic precursors suitable to produce hybrid gels can be dispersed in mixture (I) as compound (C). Particularly suitable are further natural or synthetic hydrocolloid-forming polymers. Thus, according to a further embodiment, the present invention thus also relates to a process as described above, wherein compound (C) is selected from the group consisting of natural and synthetic hydrocolloid-forming polymers.

Further natural or synthetic hydrocolloid-forming polymers include (partially) water-soluble, natural or synthetic polymers that form gels or viscous solutions in aqueous systems. They are expediently selected from further natural polysaccharides, synthetically modified derivatives thereof or synthetic polymers. Further polysaccharides include e.g. homoglycans or heteroglycans such as, for example, carrageenan, pectins, tragacanth, guar gum, carob-bean gum, agar, gum arabic, xanthan gum, natural and modified starches, dextrans, dextrin, maltodextrins, chitosan, glucans, such as beta-1,3-glucan, beta-1,4-glucan, cellulose, mucopolysaccharides, such as, in particular hyaluronic acid. Synthetic polymers include cellulose ethers, polyvinyl alcohol, polyvinyl pyrrolidone, synthetic cellulose derivatives, such as methylcellulose, carboxycellulose, carboxymethylcellulose, in particular sodium carboxymethycellulose, cellulose esters, celluloses ethers such as hydroxypropylcellulose, polyacrylic acid, polymethacrylic acid, poly(methyl methacrylate) (PMMA), polymethacrylate (PMA), polyethylene glycols etc. Mixtures of these polymers may also be used.

Moreover, one or more auxiliary substances might be comprised in mixture (I) according to the present invention. Auxiliary substances include: fillers, pH-adjustment agents, such as buffering substances, stabilizers, co-solvents, pharmaceutically and cosmetically conventional or other dyestuffs and pigments, preservatives, plasticizers, lubricants and slip additives.

According to step b) of the present invention, a gel (A) is prepared. Step b) comprises the steps b1) and b2). According to step b1), mixture (I) is exposed to carbon dioxide at a pressure in the range of from 20 to 100 bar for a time sufficient to form a gel (A), and according to step b2), the gel (A) is depressurized.

According to the present invention, step b1) is carried out at a pressure in the range from 20 to 100 bar, preferably in a range of from 30 to 80 bar, in particular in a range of from 40 to 60 bar, more preferably in a range of from 45 to 55 bar. The pressure might be applied for the duration of step b1). The pressure might also be varied over the duration of step b1).

According to step b), mixture (I) is exposed to pressurized carbon dioxide at a suitable temperature preferably for several hours followed by depressurization to ambient pressure. Gel (A) is formed as a result of the pressurization/depressurization process.

By exposing mixture (I) to carbon dioxide according to step b1), the pH value of the mixture (I) might be altered. Carbon dioxide, being dissolved in aqueous media, acts as a weak acid and thus the formation of cations from insoluble carbonates initiating the crosslinking reaction might be influenced. Adjustment of pressure, in particular carbon dioxide pressure, and temperature thus allows to influence the gel structure.

According to a further embodiment, the present invention also relates to a process as described above, wherein the depressurization is carried out at a rate in the range of from 0.05 bar/min to 5 bar/min, in particular in the range of from 0.1 bar/min to 1 bar/min, more preferred in the range of from 0.5 bar/min to 1 bar/min.

In step b) of the process of the invention, the gel is usually formed by allowing to rest, e.g. by simply allowing the container, reaction vessel or reactor in which the mixture is present (hereinafter referred to as gelling apparatus) to stand. The mixture is preferably no longer stirred or mixed during gelling (gel formation) because this could hinder formation of the gel.

Gelling is known per se to a person skilled in the art and is described, for example, in WO 2009/027310 on page 21, line 19 to page 23, line 13.

Preferably, temperature and pressure in step b), in particular step b1) and b2), are adjusted to conditions under which carbon dioxide is gaseous. A suitable temperature might be in the range of from 10 to 40° C., preferable in the range of from 15 to 35° C. According to a further embodiment, the present invention also relates to a process as described above, wherein step b) is carried out at a temperature in the range of from 10 to 40° C.

According to a further embodiment, the present invention also relates to a process as described above, wherein carbon dioxide is gaseous under the reaction conditions in step b1).

Varying depressurization rate and thickness of the initial suspension, hydrogels can be produced either homogeneous (as assessed visually and by scanning electron microscopy) or with shell-like voids in the millimeter range. Thus, macroporosity can be introduced within the gelation step.

The rate of formation of the insoluble gel, in particular the alginate, and thus the flowability or pourability of the alginate solution or suspension, can be controlled very exactly and easily by choosing a suitable temperature and/or pressure. Furthermore, a temperature gradient and/or a pressure gradient might be applied.

Gel (A) obtained in step b) is a gel comprising water, i.e. a hydrogel. According to the present invention gel (A) obtained in step b) is exposed to a water miscible solvent (L) to obtain a gel (B) in step c) of the process of the present invention.

However, it is also possible to use the hydrogel (A) obtained as an intermediate of the process as disclosed above as such. Many applications for hydrogels are known. The hydrogel (A) is particularly homogenous, and thick stable layers can be prepared according to the present invention.

According to the present invention, a water miscible solvent (L) is used in step c). In the context of the present invention, water miscible means that the solvent is at least partially miscible with water in order to allow an exchange of solvent in the gel.

Solvent exchange is carried out either by soaking the gel directly in the new solvent (one-step) or by following a sequential soaking (multi-step) in different water-to-new solvent mixtures with increasing content in the new solvent after a certain time (exchange frequency) in the previous soaking step (Robitzer et al., 2008, Langmuir, 24(21), 12547-12552). The solvent chosen for water replacement must satisfy the requirements of not dissolving the gel structure, being completely soluble with the solvent which precedes them (water) and preferably also accepted for manufacturing of pharmaceuticals.

The solvent (L) can in principle be any suitable compound or mixture of a plurality of compounds, which meets the above requirements with the solvent (L) being liquid under the temperature and pressure conditions of step c).

According to the present invention, step c) might be carried out at ambient pressure. However, it is also possible to carry out step c) at elevated pressure. Preferably, step c) is carried out at a pressure above 10 bar, in particular at a pressure below 150 bar.

For example, step c) might be carried out at a pressure in the range of from 10 to 150 bar, preferably in the range of from 10 to 100 bar, more preferably in a range of from 20 to 80 bar, in particular in a range of from 30 to 70 bar, more preferably in a range of from 40 to 50 bar. Furthermore, it is possible that step c) is carried out at a pressure in the range of from 30 to 150 bar, preferably in the range of from 30 to 120 bar, more preferably in a range of from 40 to 90 bar, in particular in a range of from 45 to 65 bar. The pressure might be applied for the duration of step c) or only for a short period.

Thus, the present invention according to a further embodiment also relates to a process as described above, wherein step c) is carried out at a pressure in the range of from 10 to 100 bar.

Furthermore, step c) might be carried out at elevated temperature, for example a temperature in the range of from 10 to 80° C., preferably in the range of from 15 to 70° C., more preferably in a range of from 20 to 60° C. The temperature might be applied for the duration of step c) or only for a short period.

According to a further embodiment of the present invention, step c) is carried out at elevated pressure and elevated temperature, for example at a pressure in the range of from 10 to 150 bar and a temperature in the range of from 10 to 80° C.

Possible solvents (L) are, for example, ketones, aldehydes, alkyl alkanoates, organic carbonates, amides such as formamide and N-methylpyrollidone, sulfoxides such as dimethyl sulfoxide, aliphatic and cycloaliphatic halogenated hydrocarbons, halogenated aromatic compounds and fluorine-containing ethers. Mixtures of two or more of the abovementioned compounds are likewise possible.

Further possibilities as solvents (L) are acetals, in particular diethoxymethane, dimethoxymethane and 1,3-dioxolane.

Dialkyl ethers and cyclic ethers are likewise suitable as solvent (L). Preferred dialkyl ethers are, in particular, those having from 2 to 6 carbon atoms, in particular methyl ethyl ether, diethyl ether, methyl propyl ether, methyl isopropyl ether, propyl ethyl ether, ethyl isopropyl ether, dipropyl ether, propyl isopropyl ether, diisopropyl ether, methyl butyl ether, methyl isobutyl ether, methyl t-butyl ether, ethyl n-butyl ether, ethyl isobutyl ether and ethyl t-butyl ether. Preferred cyclic ethers are, in particular, tetrahydrofuran, dioxane and tetrahydropyran.

Aldehydes and/or ketones are particularly preferred as solvent (L). Aldehydes or ketones suitable as solvent (L) are, in particular, those corresponding to the general formula $R^2$—(CO)—$R^1$, where $R^1$ and $R^2$ are each hydrogen or an alkyl group having 1, 2, 3, 4, 5, 6 or 7 carbon atoms. Suitable aldehydes or ketones are, in particular, acetaldehyde, propionaldehyde, n-butyraldehyde, isobutyraldehyde, 2-ethylbutyraldehyde, valeraldehyde, isopentaldehyde, 2-methylpentaldehyde, 2-ethylhexaldehyde, acrolein, methacrolein, crotonaldehyde, furfural, acrolein dimer, methacrolein dimer, 1,2,3,6-tetrahydrobenzaldehyde, 6-methyl-3-cyclohexenaldehyde, cyanoacetaldehyde, ethyl glyoxylate, benzaldehyde, acetone, diethyl ketone, methyl ethyl ketone, methyl isobutyl ketone, methyl n-butyl ketone, methyl pentylketone, dipropyl ketone, ethyl isopropyl ketone, ethyl butyl ketone, diisobutylketone, 5-methyl-2-acetyl furan, 2-acetylfuran, 2-methoxy-4-methylpentan-2-one, 5-methylheptan-3-one, octanone, cyclohexanone, cyclopentanone, and acetophenone. The abovementioned aldehydes and ketones can also be used in the form of mixtures. Ketones and aldehydes having alkyl groups having up to 3 carbon atoms per substituent are preferred as solvent (L).

Further preferred solvents are alkyl alkanoates, in particular methyl formate, methyl acetate, ethyl formate, isopropyl acetate, butyl acetate, ethyl acetate, glycerine triacetate and ethyl acetoacetate. Preferred halogenated solvents are described in WO 00/24799, page 4, line 12 to page 5, line 4.

Further suitable solvents (L) are organic carbonates such as for example dimethyl carbonate, ethylene carbonate, propylene carbonate or butylene carbonate.

In many cases, particularly suitable solvents (L) are obtained by using two or more completely miscible compounds selected from the above mentioned solvents.

According to the present invention, a solvent (L) is used. The solvent (L) can also be a mixture of two or more solvents, for example three or four solvents. Suitable solvents are for example mixtures of two or more ketones, for example mixtures of acetone and diethyl ketone, mixtures of acetone and methyl ethyl ketone or mixtures of diethyl ketone and methyl ethyl ketone.

According to a further embodiment, the present invention therefore also relates to a process as described above, wherein the solvent (L) is selected from the group consisting of ethers, esters, alcohols, ketones, aldehydes, alkyl alkanoates, organic carbonates, amides, sulfoxides, aliphatic and cycloaliphatic halogenated hydrocarbons, halogenated aromatic compounds and fluorine-containing ethers.

According to a further embodiment, the present invention also relates to a process as described above, wherein the solvent used in step c) is selected from the group consisting of C1 to C6 alcohols and C1 to C6 ketones and mixtures thereof. Particularly suitable are alcohols such as methanol, ethanol and isopropanol and ketones such as acetone, and methyl ethyl ketone.

The solvent exchange according to step b) might be carried out in one step or in multiple steps with varying concentration of the solvent. According to a preferred embodiment, gels (A) are successively immersed in ethanol/water mixtures with concentrations of for example 30, 60, 90 and 100 wt % for 2 to 12 h in each.

In step c), gel (B) is obtained. According to step d) of the process of the present invention, gel (B) obtained in step c) is dried.

Drying in step (d) takes place in a known manner. Drying under supercritical conditions is preferred, preferably after replacement of the solvent by $CO_2$ or other solvents suitable for the purposes of supercritical drying. Such drying is known per se to a person skilled in the art. Supercritical conditions characterize a temperature and a pressure at which $CO_2$ or any solvent used for removal of the gelation solvent is present in the supercritical state. In this way, shrinkage of the gel body on removal of the solvent can be reduced.

However, in view of the simple process conditions, preference is given to drying the gels obtained by conversion of the liquid comprised in the gel into the gaseous state at a temperature and a pressure below the critical temperature and the critical pressure of the liquid comprised in the gel.

According to one embodiment, the drying of the gel obtained is preferably carried out by converting the solvent (L) into the gaseous state at a temperature and a pressure below the critical temperature and the critical pressure of the solvent (L). Accordingly, drying is preferably carried out by removing the solvent (L) which was present in the reaction without prior replacement by a further solvent.

Such methods are likewise known to those skilled in the art and are described in WO 2009/027310 on page 26, line 22 to page 28, line 36.

According to a further embodiment, the present invention is directed to the process for preparing a porous material as disclosed above, wherein the drying according to step d) is carried out by converting the liquid comprised in the gel into the gaseous state at a temperature and a pressure below the critical temperature and the critical pressure of the liquid comprised in the gel.

According to a further embodiment, the present invention is directed to the process for preparing a porous material as disclosed above, wherein the drying according to step d) is carried out under supercritical conditions.

The process of the present can also comprise further steps such as for example a shaping step. According to the present invention, the porous material can for example be cut into shape after step d) of the process. According to the present invention it is also possible to form the gel in a defined shape.

According to the present invention, it is also possible to reduce the gel to smaller gel particles with a diameter in the range of from 10 to 500 µm which then can be dried as set out above. According to this embodiment of the process of the present invention, a porous material, in particular an aerogel, in the form of small particles is obtained.

According to the present invention, the (still) flowable mixture (I) might be poured into a mold with the desired shape. Herein, layer thicknesses of the flowable polysaccharide composition, for example the alginate composition of up to 50 cm are possible. Preferred shapes are box shapes with a rectangular layout. Pouring can take place at any suitable stage of the process.

Properties of the Porous Materials and Use

The present invention also relates to a porous material, which is obtained or obtainable by the process as described above. The porous materials of the present invention are preferably aerogels or xerogels.

For the purposes of the present invention, a xerogel is a porous material which has been produced by a sol-gel process in which the liquid phase has been removed from the gel by drying below the critical temperature and below the critical pressure of the liquid phase ("subcritical conditions"). An aerogel is a porous material which has been produced by a sol-gel process in which the liquid phase has been removed from the gel under supercritical conditions.

The process as disclosed above results in porous materials with improved properties, in particular improved thermal conductivity. Aerogels produced according to the process of the present invention preferably have a low density, and preferably high specific surface area, for example in the range of from 200 to 800 m$^2$/g. Furthermore, a pore volume in the range of from 2.1 to 9.5 cm$^3$/g for pore sizes <150 nm can be obtained and preferably low thermal conductivity, for example as low as 18±2 mW/m·K.

Furthermore, the present invention therefore is directed to a porous material which is obtained or obtainable by the process for preparing a porous material as disclosed above. In particular, the present invention is directed to a porous material which is obtained or obtainable by the process for preparing a porous material as disclosed above, wherein the drying according to step c) is carried out under supercritical conditions.

The porous material according to the invention preferably has a density in the range of 0.005 to 1 g/cm$^3$, preferably from 0.01 to 0.5 g/cm$^3$ (determined according to DIN 53420).

The average pore diameter is determined by scanning electron microscopy and subsequent image analysis using a statistically significant number of pores. Corresponding methods are known to those skilled in the art. For characterization of the porous structure of aerogels a Nova 3000 Surface Area Analyzer from Quantachrome Instruments was used. It uses adsorption and desorption of nitrogen at a constant temperature of –196° C.

The volume average pore diameter of the porous material is preferably not more than 4 microns. The volume average pore diameter of the porous material is particularly preferably not more than 3 microns, very particularly preferably not more than 2 microns and in particular not more than 1 micron.

Although a very small pore size combined with a high porosity is desirable from the point of view of a low thermal conductivity, from the point of view of production and to obtain a sufficiently mechanically stable porous material, there is a practical lower limit to the volume average pore diameter. In general, the volume average pore diameter is at least 20 nm, preferably at least 50 nm.

The porous material which can be obtained according to the invention preferably has a porosity of at least 70% by volume, in particular from 70 to 99% by volume, particularly preferably at least 80% by volume, very particularly preferably at least 85% by volume, in particular from 85 to 95% by volume. The porosity in % by volume means that the specified proportion of the total volume of the porous material comprises pores. Although a very high porosity is usually desirable from the point of view of a minimal thermal conductivity, an upper limit is imposed on the porosity by the mechanical properties and the processability of the porous material.

The process of the invention gives a coherent porous material and not only a polymer powder or particles. Here, the three-dimensional shape of the resulting porous material is determined by the shape of the gel which is in turn determined by the shape of the gelling apparatus. Thus, for example, a cylindrical gelling vessel usually gives an approximately cylindrical gel which can then be dried to give a porous material having a cylindrical shape. However, it is also possible to obtain a porous material in the form of particles with a diameter of less than 500 µm according to the present invention as set out above.

The porous materials which can be obtained according to the invention preferably have a low thermal conductivity, a high porosity and a low density combined with high mechanical stability. In addition, the porous materials preferably have a small average pore size. The combination of the abovementioned properties allows the materials to be used as insulation material in the field of thermal insulation, in particular for applications in the ventilated state as building materials.

The porous materials which can be obtained according to the invention have advantageous thermal properties and preferably also further advantageous properties such as simple processability and high mechanical stability, for example low brittleness.

The present invention is also directed to the use of porous materials as disclosed above or a porous material obtained or obtainable according to a process as disclosed above as thermal insulation material or for vacuum insulation panels. The thermal insulation material is for example insulation material which is used for insulation in the interior or the exterior of a building. The porous material according to the present invention can advantageously be used in thermal insulation systems such as for example composite materials.

According to a further embodiment, the present invention therefore is directed to the use of porous materials as disclosed above, wherein the porous material is used in interior or exterior thermal insulation systems.

Furthermore, the present invention relates to the use of the porous materials according to the invention for cosmetic applications, for biomedical applications, for pharmaceutical applications and also for the manufacture of a medical product. Such medical products include, for example, wound dressings, transdermal dressings, wound plasters, implants, substrates for cultivating cells, means for the controlled, in particular retarded, administering of active substances in the form of said implants, but also as a preparation to effect such retardation that can be administered orally, or as so-called satiation comprimates that have a satiation effect because of the expansion of the compressed porous shaped article in the stomach. The latter may also be loaded with dietary supplements, vitamins, minerals or other active substances.

According to a further aspect, the present invention relates to the use of porous materials as disclosed above or a porous material obtained or obtainable by the process as disclosed above as thermal insulation material, for cosmetic applications, for biomedical applications or for pharmaceutical applications.

According to a further aspect, the present invention is also directed to a process for preparing a hydrogel, at least comprising the steps of:
a) providing a mixture (I) comprising
 (i) a water soluble polysaccharide,
 (ii) at least one compound suitable to react as cross-linker for the polysaccharide or to release a cross-linker for the polysaccharide,
 (iii) water,
b) preparing a gel (A) comprising steps b1) and b2)
 b1) exposing mixture (I) to carbon dioxide at a pressure in the range of from 20 to 100 bar for a time sufficient to form a gel (A), and
 b2) depressurizing the gel (A).

In particular, the present invention is directed to a process for preparing a hydrogel, at least comprising the steps of:
a) providing a mixture (I) comprising
 (i) a water soluble alginate,
 (ii) at least one compound suitable to react as cross-linker for the alginate or to release a cross-linker for the alginate,
 (iii) water,
b) preparing a gel (A) comprising steps b1) and b2)
 b1) exposing mixture (I) to carbon dioxide at a pressure in the range of from 20 to 100 bar for a time sufficient to form a gel (A), and
 b2) depressurizing the gel (A).

With respect to preferred embodiments of the process, reference is made to the disclosure above regarding the process for preparing a porous material according to the present invention.

Furthermore, the present invention is directed to a hydrogel, which is obtained or obtainable by the process as disclosed above. The present invention is also directed to the use of a hydrogel as disclosed above for cosmetic applications, for biomedical applications or for pharmaceutical applications.

The method according to the present invention allows to produce hydrogels with polysaccharide concentrations, for example alginate concentrations, as low as 0.05 wt %, being stable at ambient conditions and can be stored in pure water for weeks without visible degradation.

The hydrogels prepared according to the process of the present invention have a stable structure and might be prepared in a thickness which is sufficient for many cosmetic, biomedical or pharmaceutical applications. Furthermore, it is possible to entrap active components or adjuvants in the gel structure using the process of the present invention. Gels with a uniform porosity might be obtained.

Preferred embodiments may be found in the claims and the description. Combinations of preferred embodiments do not go outside the scope of the present invention. Preferred embodiments of the components used are described below.

The present invention includes the following embodiments, wherein these include the specific combinations of embodiments as indicated by the respective interdependencies defined therein.

1. Process for preparing a porous material, at least comprising the steps of:
  a) providing a mixture (I) comprising
   (i) a water soluble polysaccharide,
   (ii) at least one compound suitable to react as cross-linker for the polysaccharide or to release a cross-linker for the polysaccharide,
   (iii) water,
  b) preparing a gel (A) comprising steps b1) and b2)
   b1) exposing mixture (I) to carbon dioxide at a pressure in the range of from 20 to 100 bar for a time sufficient to form a gel (A), and
   b2) depressurizing the gel (A),
  c) exposing the gel (A) obtained in step b) to a water miscible solvent (L) to obtain a gel (B),
  d) drying of the gel (B) obtained in step c).
2. The process according to embodiment 1, wherein the water soluble polysaccharide is an alginate.
3. The process according to any of embodiments 1 or 2, wherein step b) is carried out at a temperature in the range of from 10 to 40° C.
4. The process according to any of embodiments 1 to 3, wherein carbon dioxide is gaseous under the reaction conditions in step b1).
5. The process according to any of embodiments 1 to 4, wherein the compound suitable to react as cross-linker for the polysaccharide or to release a cross-linker for the polysaccharide is selected from the group consisting of carbonates and hydroxy carbonates.
6. The process according to any of embodiments 1 to 5, wherein mixture (I) comprises calcium carbonate as compound (ii).
7. The process according to any of embodiments 1 to 6, wherein the solvent (L) is selected from the group consisting of ethers, esters, alcohols, ketones, aldehydes, alkyl alkanoates, organic carbonates, amides, sulfoxides, aliphatic and cycloaliphatic halogenated hydrocarbons, halogenated aromatic compounds and fluorine-containing ethers.
8. The process according to any of embodiments 1 to 7, wherein the solvent (L) used in step c) is selected from the group consisting of C1 to C6 alcohols and C1 to C6 ketones and mixtures thereof.
9. The process according to any of embodiments 1 to 8, wherein a water insoluble solid (S) is added to mixture (I).
10. The process according to any of embodiments 1 to 9, wherein a compound (C) is added to mixture (I) in step a) which is suitable to form a gel.
11. The process according to any of embodiments 1 to 10, wherein step c) is carried out at a pressure in the range of from 10 to 100 bar.
12. The process according to any of embodiments 1 to 11, wherein the drying according to step d) is carried out by converting the liquid comprised in the gel into the gaseous state at a temperature and a pressure below the critical temperature and the critical pressure of the liquid comprised in the gel.

13. The process according to any of embodiments 1 to 11, wherein the drying according to step d) is carried out under supercritical conditions.
14. A porous material, which is obtained or obtainable by the process according to any of embodiments 1 to 13.
15. The use of porous materials according to embodiment 14 or a porous material obtained or obtainable by the process according to any of embodiments 1 to 13 as thermal insulation material, for cosmetic applications, for biomedical applications or for pharmaceutical applications.
16. Process for preparing a porous material, at least comprising the steps of:
    a) providing a mixture (I) comprising
       (i) a water soluble alginate,
       (ii) at least one compound suitable to react as cross-linker for the alginate or to release a cross-linker for the alginate,
       (iii) water,
    b) preparing a gel (A) comprising steps b1) and b2)
    b1) exposing mixture (I) to carbon dioxide at a pressure in the range of from 20 to 100 bar for a time sufficient to form a gel (A), and
    b2) depressurizing the gel (A),
    c) exposing the gel (A) obtained in step b) to a water miscible solvent (L) to obtain a gel (B),
    d) drying of the gel (B) obtained in step c).
17. The process according to embodiment 16, wherein step b) is carried out at a temperature in the range of from 10 to 40° C.
18. The process according to any of embodiments 16 or 17, wherein carbon dioxide is gaseous under the reaction conditions in step b1).
19. The process according to any of embodiments 16 to 18, wherein the compound suitable to react as cross-linker for the alginate or to release a cross-linker for the alginate is selected from the group consisting of carbonates and hydroxy carbonates.
20. The process according to any of embodiments 16 to 19, wherein mixture (I) comprises calcium carbonate as compound (ii).
21. The process according to any of embodiments 16 to 20, wherein the solvent (L) is selected from the group consisting of ethers, esters, alcohols, ketones, aldehydes, alkyl alkanoates, organic carbonates, amides, sulfoxides, aliphatic and cycloaliphatic halogenated hydrocarbons, halogenated aromatic compounds and fluorine-containing ethers.
22. The process according to any of embodiments 16 to 21, wherein the solvent (L) used in step c) is selected from the group consisting of C1 to C6 alcohols and C1 to C6 ketones and mixtures thereof.
23. The process according to any of embodiments 16 to 22, wherein a water insoluble solid (S) is added to mixture (I).
24. The process according to any of embodiments 16 to 23, wherein a compound (C) is added to mixture (I) in step a) which is suitable to form a gel.
25. The process according to any of embodiments 16 to 24, wherein step c) is carried out at a pressure in the range of from 10 to 100 bar.
26. The process according to any of embodiments 16 to 25, wherein the drying according to step d) is carried out by converting the liquid comprised in the gel into the gaseous state at a temperature and a pressure below the critical temperature and the critical pressure of the liquid comprised in the gel.
27. The process according to any of embodiments 16 to 25, wherein the drying according to step d) is carried out under supercritical conditions.
28. A porous material, which is obtained or obtainable by the process according to any of embodiments 16 to 27.
29. The use of porous materials according to embodiment 28 or a porous material obtained or obtainable by the process according to any of embodiments 16 to 27 as thermal insulation material, for cosmetic applications, for biomedical applications or for pharmaceutical applications.
30. Process for preparing a hydrogel, at least comprising the steps of:
    a) providing a mixture (I) comprising
       (i) a water soluble polysaccharide,
       (ii) at least one compound suitable to react as cross-linker for the polysaccharide or to release a cross-linker for the polysaccharide,
       (iii) water,
    b) preparing a gel (A) comprising steps b1) and b2)
    b1) exposing mixture (I) to carbon dioxide at a pressure in the range of from 20 to 100 bar for a time sufficient to form a gel (A), and
    b2) depressurizing the gel (A).
31. Process for preparing a hydrogel, at least comprising the steps of:
    a) providing a mixture (I) comprising
       (i) a water soluble alginate,
       (ii) at least one compound suitable to react as cross-linker for the alginate or to release a cross-linker for the alginate,
       (iii) water,
    b) preparing a gel (A) comprising steps b1) and b2)
    b1) exposing mixture (I) to carbon dioxide at a pressure in the range of from 20 to 100 bar for a time sufficient to form a gel (A), and
    b2) depressurizing the gel (A).
32. The process according to any of embodiments 30 or 31, wherein step b) is carried out at a temperature in the range of from 10 to 40° C.
33. The process according to any of embodiments 30 to 32, wherein carbon dioxide is gaseous under the reaction conditions in step b1).
34. The process according to any of embodiments 30 to 33, wherein the compound suitable to react as cross-linker for the polysaccharide or to release a cross-linker for the polysaccharide is selected from the group consisting of carbonates and hydroxy carbonates.
35. The process according to any of embodiments 30 to 34, wherein mixture (I) comprises calcium carbonate as compound (ii).
36. The process according to any of embodiments 30 to 35, wherein a water insoluble solid (S) is added to mixture (I).
37. The process according to any of embodiments 30 to 36, wherein a compound (C) is added to mixture (I) in step a) which is suitable to form a gel.
38. A hydrogel, which is obtained or obtainable by the process according to any of embodiments 30 to 37.
39. The use of a hydrogel according to embodiment 38 or a hydrogel obtained or obtainable by the process according to any of embodiments 30 to 37 for cosmetic applications, for biomedical applications or for pharmaceutical applications.

Examples will be used below to illustrate the invention.

EXAMPLES

1. Example 1

Sodium alginate solution was prepared by gentle stirring of sodium alginate powder (obtained from Sigma-Aldrich)

with appropriate amount of water for 12 h. Calcium carbonate was suspended in water by vigorous mixing for 5 min. Keeping the agitation up, a certain part of the suspension was bled off and immediately transferred into the sodium alginate solution (0.25; 0.5; 1.0 wt %) to reach a target sodium alginate/$CaCO_3$ ratio (Table 1). The mixture was again agitated until it became homogeneous. All prepared suspensions were transferred into a high pressure autoclave for subsequent gelation. Final concentrations of sodium alginate solutions are listed in Table 1. Sodium alginate/$CaCO_3$ ratio of 1:0.1825 denoted as factor F=1.0.

The autoclave was pressurized with gaseous carbon dioxide up to 50 bar at room temperature (25° C.). Pressure was maintained for 12 h and then slowly released (0.2 bar/min). Hydrogels formed were either transparent or translucent. The gels were washed with water and successively immersed in ethanol/water mixtures with concentrations of 30, 60, 90 and 100 wt % for 12 h in each. Step wise concentration is recommended as high concentration gradients during solvent exchange cause irreversible shrinkage to the hydrogel.

Alcogels were packed into filter paper parcels, placed into preheated high pressure autoclave (40° C.) and filled with ethanol to prevent premature solvent evaporation. Supercritical drying was performed using the same autoclave as for gelation. The autoclave was sealed and $CO_2$ was filled in by a membrane pump. Keeping the pressure constant around 120 bar, 6-7 residence volumes of $CO_2$ was used to dry the gel. Then system was depressurized in 1 h followed by cooling down to room temperature. Properties of the resulting aerogels are summarized in Table 1.

Alternative with high pressure solvent exchange—The gels were washed under increased pressure of $CO_2$ of 50 bar at room temperature with water and successively immersed in ethanol/water mixtures with concentrations of 30, 60, 90 and 100 wt % for 12 h in each. Step wise concentration is recommended as high concentration gradients during solvent exchange cause irreversible shrinkage to the hydrogel

TABLE 1

Properties of the aerogels from Example 1

| Final sodium alginate concentration, wt % | F | Bulk density, g/cm³ | BET surface area, m²/g | BJH pore volume, cm³/g | Thermal conductivity, mW/m · K [1] |
|---|---|---|---|---|---|
| 0.49 | 0.5 | 0.037 | 473 ± 90 | 5.68 | |
| 0.25 | 1.0 | 0.024 | 436 ± 96 | 4.34 | |
| 0.49 | 1.0 | 0.028 | 479 ± 67 | 6.98 | |
| 0.97 | 1.0 | 0.042 | 487 ± 67 | 4.55 | 22 ± 2 |
| 0.25 | 2.0 | — | — | — | 18 ± 2 |
| 0.50 | 2.0 | — | — | — | 19 ± 2 |

[1] Thermal conductivity was determined by hot-wire measurements at ambient pressure and room temperature. Procedure as described by Reichenauer et. al, (Reichenauer, G., Heinemann, U., and Ebert, H.-P. (2007). Relationship between pore size and the gas pressure dependence of the gaseous thermal conductivity. Colloids and Surfaces A: Physicochemical and Engineering Aspects 300, 204-210).

For characterization of the porous structure of aerogels a Nova 3000 Surface Area Analyzer from Quantachrome Instruments was used. It uses adsorption and desorption of nitrogen at a constant temperature of −196° C.

According to the present invention, $CaCO_3$ is directly dispersed in water, which is then slowly dissolved by decreasing the pH value. Solubility of carbon dioxide increases with rising pressure along with lowering of pH down to 3. Solubility of calcium carbonate also increases with pressure resulting in release of calcium ions. At conditions used in this study for gelation (50 bar, 25° C.), solubility of $CaCO_3$ is much higher (2.9 g/L) than at ambient conditions (0.01 g/L). Concentration of $CaCO_3$ in the final mixtures lies between 0.23 and 4.4 g/L. Hence more than half of introduced calcium carbonate is dissolved at equilibrium conditions and available to crosslink alginate chains. The hydrogels obtained using the disclosed $CO_2$ induced gelation were stable at ambient conditions and can be stored in pure water for weeks without visible degradation (in presence of a preservative to avoid bacterial decomposition).

The samples prepared by the process disclosed herein show extremely high BJH pore volumes of up to 5.68 and 6.98 cm³/g, respectively, displaying values close to silica aerogels (typically around 6 cm³/g).

2. Example 2

Sodium alginate of 3 wt % was mixed with 3 wt % water solution of the second polymer (Table 2). In cases of base soluble mixtures such as Lignin and Eudragit L100, 1 M sodium hydroxide was used instead water to dissolve Eudragit L100 and lignin. To incorporate insoluble gel/aerogel matrices, hydrophobic silica alcogels using MTMS were first prepared using the recipe described in (Rao et al., 2006, Synthesis of flexible silica aerogels using methyltrimethoxysilane (MTMS) precursor. Journal of Colloid and Interface Science 300, 279-285). Then alcogels were washed with water to obtain hydrogel. The later was crushed and dispersed in sodium alginate solution. Mixture was diluted with water to reach the overall polymer concentration of 1.5 wt %. The subsequent procedure was the same as described in Example 1, with the only difference that solid calcium carbonate was dispersed in the mixture instead of using suspended $CaCO_3$.

TABLE 2

Properties of hybrid alginate-based aerogels

| Polymer | F | Bulk density, g/cm³ | BET surface area, m²/g | BJH pore volume, cm³/g |
|---|---|---|---|---|
| Carboxymethyl cellulose | 2.0 | 0.025 | 812 | 7.90 |
| Gellan gum | 2.0 | 0.033 | 346 | 2.98 |
| Eudragit L100 | 1.0 | 0.039 | — | — |
| Gelatin | 1.0 | 0.043 | 208 | 3.24 |
| Polyvinylalcohol | 1.0 | 0.038 | 690 | 5.47 |
| Pluronic | 1.0 | 0.051 | 444 | 7.93 |
| Starch [1] | 1.0 | 0.066 | 544 | 6.77 |
| Starch [1] | 2.0 | 0.058 | 435 | 4.08 |
| Polyethylene glycol (Mw = 10 000) | 1.0 | 0.054 | 555 | 6.96 |
| Polyethylene glycol (Mw = 100 000) | 1.0 | 0.068 | 591 | 6.94 |
| Methylcellulose | 1.0 | 0.058 | 505 | 9.50 |
| Lignin [2] | 2.0 | 0.062 | 456 | 2.6 |
| Amidated Pectin [3] | 1.0 | 0.099 | 739 | 7.88 |
| h-Carrageenan [3] | 1.0 | 0.049 | 593 | 4.77 |
| Hydrophobic silica dispersed in alginate [3] | 1.0 | 0.201 | 436 | 2.11 |

[1] alginate/starch ratio of 5.0 (g/g) was used,
[2] alginate/lignin ratio of 4.0 (g/g) was used
[3] mixture of alginate (3 wt %) and second biopolymer (3 wt %) not diluted further to 1.5%.

The thermal conductivities of select biopolymer mixtures (overall composition: 1.5 wt %) were analyzed and are presented in Table 3. The method of measurement is by hot-wire measurements as described in Reichenauer et. al, (Reichenauer, G., Heinemann, U., and Ebert, H.-P. (2007). Relationship between pore size and the gas pressure dependence of the gaseous thermal conductivity. Colloids and Surfaces A: Physicochemical and Engineering Aspects 300, 204-210).

TABLE 3

Thermal conductivity of hybrid alginate-based aerogels

| Second Bio-polymer | Weight ratio (Alginate/ second Bio-polymer) | Cross-linking factor (F) | Bulk density, g/cm³ | Dimensions (mm) | | | Thermal conductivity, mW/ m · K [1] |
|---|---|---|---|---|---|---|---|
| | | | | l | w | h | |
| Starch | 1.0 | 1.0 | 0.100 | 77.6 | 34.6 | 6.9 | 21.6 |
| Starch | 1.0 | 2.0 | 0.067 | 76.5 | 34.6 | 9.5 | 20.4 |
| Lignin | 3.0 | 1.0 | 0.048 | 51.3 | 34.7 | 7.3 | 19.4 |

[1] Thermal conductivity was determined by hot-wire measurements at ambient pressure and room temperature 3. Example 3

Powder of zinc hydroxy carbonate, nickel hydroxy carbonate or cobalt carbonate was added to sodium alginate solution of 3 wt %. The mixture was vortexed for 1 min. The subsequent procedure was the same as described in Example 1. Textural properties are listed in Table 4.

TABLE 4

Properties of alginate-based aerogels with various cations

| Crosslinking cation | Factor [1] | Bulk density, g/cm³ | BET surface area, m²/g | BJH pore volume, cm³/g |
|---|---|---|---|---|
| Zinc (ZIN-D001) | 1.0 | 0.093 | 553 | 5.23 |
| Cobalt (COB-D001) | 1.0 | 0.098 | 546 | 6.36 |
| Nickel (NIC-D001) | 1.0 | 0.100 | 668 | 6.40 |

[1] molar amount of cations was the same as for calcium in example 1

The invention claimed is:

1. A porous material obtained by a process comprising:
 a) providing a mixture (I) comprising
  (i) a water soluble polysaccharide,
  (ii) a compound which reacts as a cross-linker for the water soluble polysaccharide or which releases a cross-linker for the water soluble polysaccharide, and
  (iii) water;
 b) preparing a gel (A) by a process comprising
  b1) exposing the mixture (I) to carbon dioxide at a pressure of from 20 to 100 bar for a time sufficient to form a gel (A), and
  b2) depressurizing the gel (A);
 c) exposing the gel (A) to a water miscible solvent (L) to obtain a gel (B); and
 d) drying the gel (B),
 wherein the water miscible solvent (L) is at least one selected from the group consisting of a C1 to C6 alcohol a C1 to C6 ketone, and a mixture thereof,
 wherein the water soluble polysaccharide is an alginate, and
 wherein the compound which reacts as a cross-linker for the water soluble polysaccharide or which releases a cross-linker for the water soluble polysaccharide in the mixture (I) comprises calcium carbonate,
 wherein the porous material has a pore volume in the range of from 2.1 to 9.5 cm³/g for pore sizes <150 nm.

2. The porous material of claim 1, wherein the preparing in b) is carried out at a temperature of from 10 to 40° C.

3. The porous material of claim 1, wherein carbon dioxide in the exposing in b1) is gaseous.

4. The porous material of claim 1, wherein a water insoluble solid (S) is further added to the mixture (I).

5. The porous material of claim 1, wherein a compound (C) is further added to the mixture (I) in the providing in a), wherein the compound (C) is at least one selected from the group consisting of a natural hydrocolloid forming polymer, a synthetic hydrocolloid-forming polymer, and a mixture thereof.

6. The porous material of claim 1, wherein the exposing in c) is carried out at a pressure of from 10 to 100 bar.

7. The porous material according to claim 1, wherein the drying in d) is carried out by converting a liquid in the gel (B) into a gaseous state at a temperature and a pressure below a critical temperature and a critical pressure of the liquid in the gel (B).

8. The porous material according to claim 1, wherein the drying in d) is carried out under supercritical conditions.

9. A cosmetic, biomedical, or pharmaceutical product, comprising:
 a thermal insulation material comprising the porous material of claim 1.

* * * * *